(12) United States Patent
Horachi

(10) Patent No.: US 6,879,595 B2
(45) Date of Patent: Apr. 12, 2005

(54) APPARATUS FOR TRANSMISSION BETWEEN SUBSCRIBER TERMINALS AND ANY TYPES OF SWITCHES

(75) Inventor: Kazunori Horachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 09/735,886

(22) Filed: Dec. 13, 2000

(65) Prior Publication Data

US 2001/0030979 A1 Oct. 18, 2001

(30) Foreign Application Priority Data

Mar. 17, 2000 (JP) ...................................... 2000-076034

(51) Int. Cl.[7] .............................................. H04L 12/56
(52) U.S. Cl. ........................ 370/410; 370/420; 370/524
(58) Field of Search ................................ 370/359, 360, 370/366, 373, 377, 384, 385, 410, 419, 420, 421, 463, 524, 538

(56) References Cited

U.S. PATENT DOCUMENTS 5,640,387 A * 6/1997 Takahashi et al. .......... 370/359

6,282,204 B1 * 8/2001 Balatoni et al. ............ 370/421

FOREIGN PATENT DOCUMENTS

| JP | 6-38616 | 4/1987 | |
|----|---------|--------|---|
| JP | 62-90065 | 4/1987 | |
| JP | 11-234770 | 8/1999 | |
| JP | 411234770 A * | 8/1999 | ........... H04Q/11/04 |

* cited by examiner

Primary Examiner—Wellington Chin
Assistant Examiner—John Shew
(74) Attorney, Agent, or Firm—Katten Muchin Zavis Rosenman

(57) ABSTRACT

An apparatus for transmission between subscriber terminals and digital switches that employ a 4:1 time-division-multiplexing scheme includes a main path for carrying signals between the subscriber terminals and digital switches, a control path which is separate from said main path and carries control information for maintenance purpose, and an interface-&-control unit which converts the control information so as to conform to specifications of the said digital switches wherein the conversion of the control information is based on switch settings made to said interface-&-control unit.

10 Claims, 17 Drawing Sheets

FIG.5

| STATUS | SWOPT=1 (VENDOR A&C) | SWOPT=2 (VENDOR B) | SWOPT=3 (NO VENDOR) (DEFAULT SETTING) |
|---|---|---|---|
| LOSS OF U-POINT SYNCHRONIZATION | 1. TRANSMIT ALARM STATUS CHANGE REPORT (AT TIME OF RETRIEVE:<br>LT OH='0111 1111 111'b<br>NT OH='0000 0000 000'b) | 1. TRANSMIT ALARM STATUS CHANGE REPORT<br>2. TRANSMIT NT1 OVERHEAD CHANGE REPORT<br>LT OH='0111 1111 111'b<br>NT OH='000x x101 111'b<br>(x:SAME AS BEFORE LOSS OF U-POINT SYNC.) | 1. TRANSMIT ALARM STATUS CHANGE REPORT<br>LT OH='1111 1111 111'b<br>NT OH=THE VALUE RECEIVED FROM NT1 (SAME SETTING AS OLD-VERSION SOFTWARE) |

FIG.6

| STATUS | SWOPT=1 (VENDOR A&C) | SWOPT=2 (VENDOR B) | SWOPT=3 (NO VENDOR) (DEFAULT SETTING) |
|---|---|---|---|
| DISCONNECTION OF POWER SUPPLY TO NT1 | 1. TRANSMIT ALARM STATUS CHANGE REPORT (AT TIME OF RETRIEVE:<br>LT OH='0111 1111 111'b<br>NT OH='0000 0000 000'b) | 1. TRANSMIT ALARM STATUS CHANGE REPORT<br>2. TRANSMIT NT1 OVERHEAD CHANGE REPORT<br>LT OH='0111 1111 111'b<br>NT OH='000x x101 111'b<br>(x:SAME AS BEFORE DISCONNECTION OF NT1 POWER SUPPLY) | 1. TRANSMIT ALARM STATUS CHANGE REPORT<br>LT OH='1111 1111 111'b<br>NT OH=THE VALUE RECEIVED FROM NT1 (SAME SETTING AS OLD-VERSION SOFTWARE) |

FIG.7

| STATUS | SWOPT=1 (VENDOR A&C) | SWOPT=2 (VENDOR B) | SWOPT=3 (NO VENDOR) (DEFAULT SETTING) |
|---|---|---|---|
| LOSS OF T-POINT SYNCHRONIZATION | 1. TRANSMIT NT1 OVERHEAD CHANGE REPORT (AT TIME OF RETRIEVE) LT OH='1111 1111 111'b NT OH='0xxx xxxx xxx'b (x:SAME AS BEFORE LOSS OF T-POINT SYNC.) | 1. TRANSMIT NT1 OVERHEAD CHANGE REPORT LT OH='1111 1111 111'b NT OH='0xxx xx0x xxx'b (x:SAME AS BEFORE LOSS OF T-POINT SYNC.) | 1. TRANSMIT ALARM STATUS CHANGE REPORT LT OH='1111 1111 111'b NT OH=THE VALUE RECEIVED FROM NT1 (SAME SETTING AS OLD-VERSION SOFTWARE) |

FIG.8

| STATUS | SWOPT=1 | SWOPT=2 | SWOPT=3 |
|---|---|---|---|
| NO CH CARD IN SLOT | TRANSMIT M_EVENT_REPORT OF EVENT REPORTING AT TIME OF NO CH CARD | TRANSMIT M_EVENT_REPORT OF EVENT REPORTING AT TIME OF NO CH CARD | TRANSMIT M_EVENT_REPORT OF LINE TERMINATION AT TIME OF NO CH CARD |
| | TRANSMIT M_EVENT_REPORT OF CHANGE OF OVERHEAD BIT REPORT VALUE IS NT OH NEW STATE: m41, m42, m43, m44, m45, m46, m47, m48, m51, m52, m61=0 | TRANSMIT M_EVENT_REPORT OF CHANGE OF OVERHEAD BIT REPORT VALUE IS NT OH NEW STATE: m41, m42, m43, m47=0 m44, m45, m46, m48, m51, m52, m61=1 | TRANSMIT NT1 OVERHEAD CHANGE REPORT VALUE IS NT OH NEW STATE: m41, m42, m43, m44, m45, m46, m47, m48, m51, m52, m61=0 |
| | TRANSMIT M_EVENT_REPORT OF EVENT REPORTING IN PRESENCE OF CH CARD | TRANSMIT M_EVENT_REPORT OF EVENT REPORTING IN PRESENCE OF CH CARD | TRANSMIT M_EVENT_REPORT OF LINE TERMINATION IN PRESENCE OF CH CARD |
| | TRANSMIT M_EVENT_REPORT OF CHANGE OF OVERHEAD BIT REPORT VALUE IS NT OH NEW STATE: m41, m42, m43, m44, m45, m46, m47, m48, m51, m52, m61=X (X:VALUE RECEIVED FROM U POINT) | TRANSMIT M_EVENT_REPORT OF CHANGE OF OVERHEAD BIT REPORT VALUE IS NT OH NEW STATE: m41, m42, m43, m44, m45, m46, m47, m48, m51, m52, m61=X (X:VALUE RECEIVED FROM U POINT) | TRANSMIT NT1 OVERHEAD CHANGE REPORT VALUE IS NT OH NEW STATE: m41, m42, m43, m44, m45, m46, m47, m48, m51, m52, m61=X (X:VALUE RECEIVED FROM U POINT) |
| | LT OH STATES="01111111"b, NT OH STATES="00000000000"b AT TIME WHEN M-GET OF ISDN FPT IS EXCUTED | LT OH STATES="01111111"b, NT OH STATES="00011101111"b AT TIME WHEN M-GET OF ISDN FPT IS EXCUTED | LT OH STATES="01111111"b, NT OH STATES="00000000000"b AT TIME WHEN M-GET OF ISDN FPT IS EXCUTED |

FIG.9

| STATUS | SWOPT=1 | SWOPT=2 | SWOPT=3 |
|---|---|---|---|
| LOSS OF U-POINT SYNCHRONIZATION | | TRANSMIT M_EVENT REPORT OF CHANGE OF OVERHEAD BIT REPORT AT TIME WHEN U-POINT CONDITION CHANGES FROM ALARM STATUS TO NORMAL STATUS VALUE IS NT OH NEWSTATE: m41, m42, m43, m44, m45, m46, m47, m48, m51, m52, m61=X (X:VALUE RECEIVED FROM U POINT) | TRANSMIT OF NT1 OVERHEAD CHANGE REPORT AT TIME WHEN U-POINT CONDITION CHANGES FROM ALARM STATUS TO NORMAL STATUS VALUE IS NT OH NEWSTATE: m41, m42, m43, m44, m45, m46, m47, m48, m51, m52, m61=X (X:VALUE RECEIVED FROM U POINT) |
| | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS |
| | | TRANSMIT M_EVENT REPORT OF CHANGE OF OVERHEAD BIT REPORT AT TIME WHEN U-POINT CONDITION CHANGES FROM ALARM STATUS TO NORMAL STATUS VALUE IS NT OH NEWSTATE: m41, m42, m43, m47=0 m46, m48, m51, m52, m61=1, m44, m45=SAME VALUE AS BEFORE | TRANSMIT CHANGE OF OVERHEAD AT TIME WHEN U-POINT CONDITION CHANGES FROM ALARM STATUS TO NORMAL STATUS VALUE IS NT OH NEWSTATE: m41, m42, m43, m44, m45, m46, m47, m48, m51, m52, m61=0 |
| | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS |
| | LT OH STATES="01111111111"b, NT OH STATES="00000000000"b AT TIME WHEN M-GET OF ISDN FPT IS EXCUTED | LT OH STATES="01111111111"b, NT OH STATES="0001X101111"b (X=SAME VALUE AS BEFORE) AT TIME WHEN M-GET OF ISDN FPT IS EXCUTED | LT OH STATES="01111111111"b, NT OH STATES="00000000000"b AT TIME WHEN M-GET OF ISDN FPT IS EXCUTED |

FIG.10

| STATUS | SWOPT=1 | SWOPT=2 | SWOPT=3 |
|---|---|---|---|
| DISCONNECTION OF NT1 POWER SUPPLY | | TRANSMIT M_EVENT REPORT OF CHANGE OF OVERHEAD BIT REPORT AT TIME WHEN U-POINT CONDITION CHANGES FROM ALARM STATUS TO NORMAL STATUS VALUE IS NT OH NEWSTATE: m41,m42,m43,m44,m45,m46,m47, m48,m51,m52,m61=X(X:VALUE RECEIVED FROM U POINT) | TRANSMIT OF NT1 OVERHEAD CHANGE REPORT AT TIME WHEN U-POINT CONDITION CHANGES FROM ALARM STATUS TO NORMAL STATUS VALUE IS NT OH NEWSTATE: m41,m42,m43,m44,m45,m46,m47, m48,m51,m52,m61=X(X:VALUE RECEIVED FROM U POINT) |
| | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM NORMAL STATUS TO ALARM STATUS | TRANSMIT M_EVENT REPORT OF EVENT REPORTING AT TIME WHEN U-POINT CONDITION CHANGES FROM NORMAL STATUS TO ALARM STATUS |
| | | TRANSMIT CHANGE OF OVERHEAD BIT REPORT AT TIME WHEN U-POINT CONDITION CHANGES FROM ALARM STATUS TO NORMAL STATUS VALUE IS NT OH NEWSTATE: m41,m42,m43,m47=0 m46,m48,m51,m52 m61=1, m44,m45=SAME VALUE AS BEFORE | TRANSMIT CHANGE OF OVERHEAD AT TIME WHEN U-POINT CONDITION CHANGES FROM ALARM STATUS TO NORMAL STATUS VALUE IS NT OH NEWSTATE: m41,m42,m43,m44,m45,m46,m47, m48,m51,m52,m61=0 |
| | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS | TRANSMIT M_EVENT REPORT OF EVENT REPORTING AT TIME WHEN U-POINT CONDITION CHANGES FROM ALARM STATUS TO NORMAL STATUS |
| | LT OH STATES="01111111111"b, NT OH STATES="000000000000"b AT TIME WHEN M-GET OF ISDN FPT FPT IS EXCUTED | LT OH STATES="01111111111"b, NT OH STATES="0001X101111"b (X=SAME VALUE AS BEFORE) AT TIME WHEN M-GET OF ISDN FPT IS EXCUTED | LT OH STATES="01111111111"b, NT OH STATES="000000000000"b AT TIME WHEN M-GET OF ISDN FPT IS EXCUTED |

FIG.11

| STATUS | SWOPT=1 | SWOPT=2 | SWOPT=3 |
|---|---|---|---|
| LOSS OF TE SYNCHRONIZATION | LT OH STATES="0111111111"b, NT OH STATES="0XXXXXXXXX"b (X=SAME ALUE AS BEFORE) AT TIME WHEN M-GET OF ISDN FPT IS EXCUTED | LT OH STATES="0111111111"b, NT OH STATES="0XXXXX0XXXX"b (X=SAME VALUE AS BEFORE) AT TIME WHEN M-GET OF ISDN FPT IS EXCUTED | LT OH STATES="0111111111"b, NT OH STATES="0XXXXXXXXX"b (X=SAME VALUE AS BEFORE) AT TIME WHEN M-GET OF ISDN FPT IS EXCUTED |

FIG.12

|  | SWOPT1 |
|---|---|
| CMISE SERVICE | M EVENT REPORT |
| EVENT TYPE | CHANGE OF OVERHEAD BIT REPORT |
| RELATED OBJECT CLASS | ISDN FRAMING PATH TERMINAL |
| EVENT ARGUMENT | OLD STATUS<br>NEW STATUS |
| CMISE SERVICE | M EVENT REPORT |
| EVENT TYPE | EVENT REPORTING |
| RELATED OBJECT CLASS | ANALOG LINE TERMINAL<br>ATT ISDN FRAMING PATH TERMINAL<br>DSI FRAMING PATH TERMINAL<br>APPARATUS<br>APPARATUS HOLDER<br>ISDN FRAMING PATH TERMINAL<br>ISDN LINE TERMINAL<br>NETWORK ELEMENT<br>MEMORY |
| EVENT ARGUMENT | PROBLEM TYPE<br>ALARM SEVERITY<br>DATA ON PROBLEM<br>MONITOR ATTRIBUTE |

FIG.13

| | SWOPT2 |
|---|---|
| CMISE SERVICE | M EVENT REPORT |
| EVENT TYPE | CHANGE OF OVERHEAD BIT REPORT |
| RELATED OBJECT CLASS | ISDN FRAMING PATH TERMINAL |
| EVENT ARGUMENT | OLD STATUS:NTOH STATUS<br>NEW STATUS:NTOH STATUS |
| CMISE SERVICE | M EVENT REPORT |
| EVENT TYPE | EVENT REPORTING |
| RELATED OBJECT CLASS | ALARM COUNT LIST<br>ANALOG LINE TERMINAL<br>CIRCUIT PACK<br>DS1 FRAMING PATH TERMINAL<br>DS1 LINE TERMINAL<br>APPARATUS<br>APPARATUS HOLDER<br>IDLC DATA LINK PROFILE<br>IDLC DATA LINE TERMINAL<br>ISDN FRAMING PATH TERMINAL<br>ISDN LINE TERMINAL<br>NETWORK ELEMENT<br>MEMORY<br>METALIC TEST ACCESS UNIT |
| EVENT ARGUMENT | PROBLEM TYPE<br>PROBLEM INFORMATION ATTRIBUTE<br>INFORMATION ON PROBLEM |

FIG.14

|  | SWOPT3 |
|---|---|
| CMISE SERVICE | M EVENT REPORT |
| EVENT TYPE | CHANGE OF OVERHEAD BIT REPORT |
| RELATED OBJECT CLASS | ISDN FRAMING PATH TERMINAL |
| EVENT ARGUMENT | OLD STATUS<br>NEW STATUS |
| CMISE SERVICE | M EVENT REPORT |
| EVENT TYPE | EVENT REPORTING |
| RELATED OBJECT CLASS | ANALOG LINE TERMINAL<br>ATT ISDN FRAMING PATH TERMINAL<br>DS1 FRAMING PATH TERMINAL<br>APPARATUS<br>APPARATUS HOLDER<br>ISDN FRAMING PATH TERMINAL<br>ISDN LINE TERMINAL<br>NETWORK ELEMENT<br>MEMORY |
| EVENT ARGUMENT | PROBLEM TYPE<br>ALARM SEVERITY<br>DATA ON PROBLEM<br>MONITOR ATTRIBUTE |

APPARATUS FOR TRANSMISSION BETWEEN SUBSCRIBER TERMINALS AND ANY TYPES OF SWITCHES

BACKGROUND OF THE INVENTION

1. Field of the Invention

The present invention generally relates to subscriber-system transmission apparatuses, and particularly relates to a subscriber-system transmission apparatus which is equipped with interface connectable to any types of switches of the IDLC type or the UDLC type and connectable to various switches of different vendors.

2. Description of the Related Art

FIG. 15 is an illustrative drawing showing a remote-station switch system having a UDLC (universal digital loop carrier) network configuration. FIG. 16 is an illustrative drawing showing a remote-station switch system having an IDLC (integrated digital loop carrier) network configuration.

The remote-station switch system of FIG. 15 having a UDLC network configuration is of a type that is used together with an analog switch. A subscriber-system transmission apparatus 1 shown in FIG. 15, which serves as a remote terminal RT, covers subscriber terminals that are scattered around in remote areas (CSA: carrier service areas) far away from an analog switch 4. The subscriber-system transmission apparatus 1 connects these subscriber terminals to the analog switch 4 via optical-fiber transmission lines. In one example of the UDLC network configuration, the subscriber-system transmission apparatus 1 is connected to the analog switch 4 via an optical-fiber transmission line, an optical transmission apparatus 9 having optical-signal multiplexing/demultiplexing functions, and a transmission apparatus 8 having electrical-signal multiplexing/demultiplexing functions. In another example of the UDLC network configuration, the subscriber-system transmission apparatus 1 is connected to the analog switch 4 via an optical-fiber transmission line and a center-station-system (COT) transmission apparatus 5 having optical-signal multiplexing/demultiplexing functions.

The remote-station switch system of FIG. 16 having an IDLC network configuration is of a type that is used together with a digital switch. In one example of this configuration, the subscriber-system transmission apparatus 1 is connected to a digital switch 3 of a TR08 type via an optical-fiber transmission line and the optical transmission apparatus 9 having optical-signal multiplexing/demultiplexing functions. In another example of this configuration, the subscriber-system transmission apparatus 1 is connected to a digital switch of a TR303 type via an optical-fiber transmission line and the optical transmission apparatus 9. The former example corresponds to a scheme in which signaling is incorporated into subscriber lines when it is transmitted, and the latter example corresponds to a scheme in which signaling is transmitted via another path. In either example of the IDLC network configuration, the transmission apparatus 8 having electrical-signal multiplexing/demultiplexing functions is made obsolete while it is of necessity in the UDLC network configuration.

The subscriber-system transmission apparatus 1 that is connected to the analog switch 4 or the digital switch 2 or 3 covers ISDN subscriber terminals. In what follows, a description will be given of an ISDN multiplexing scheme.

ISDN Multiplexing Scheme

At a U point on a digital subscriber line, signals corresponding to the following items are provided.

64 kbps B1 and B2 channels (data channel)

16 kbps D channel (data channel)

synchronization word

M channel (for maintenance purpose)
  1. crc (cyclic redundancy check) bit
  2. febe (far end block error) bit
  3. eoc (embedded operation channel) bit
  4. I (indicator) bit FIG. 17 shows a related-art UDLC system.

In the related-art UDLC system as shown in FIG. 17, 2B+D signals and M-channel signal are multiplexed as they are received through a U point (i.e., an interface between a switch and a COT), followed by transmitting the multiplexed signals to the subscriber-system transmission apparatus 1 situated on the remote station side. The subscriber-system transmission apparatus 1 demultiplexes the received signals, and transmits the demultiplexed signals to a U point (i.e., an interface between a remote station RT and an NT1 apparatus 6). The same operation is performed when signals are transmitted in the opposite direction.

The signals described above are multiplexed by the unit of DS0 (64 kbps) on digital facility. Multiplexing schemes used in this operation include:

1) 3DS0 time division multiplexing; and 2) 4:1 time division multiplexing.

3DS0 Time-division-multiplexing Scheme

The 3DS0 time-division-multiplexing scheme uses 3 DS0s for the purpose of multiplexing 2B+D on a digital subscriber line into one set of signals. Allocation of DS0s is as follows.

B1 channel—DS0 (B1)

B2 channel—DS0 (B2)

D channel, M channel—DS0 (D+) DS0 (B1), DS0(B2), and DS0(D+) as described above together constitute 3DS0.

DS0 that is allocated to the D channel and the M channel is called a D+ byte. The related-art ISDN switches employ 3DS0 time-division-multiplexing scheme, and three DS0 time slots are allocated on the digital facility at all times.

4:1 Time-division-multiplexing Scheme

In the 4:1 time-division-multiplexing scheme, the B1 and B2 channels are allocated to 2 DS0s, and four D channels are allocated to one DS0 for the purpose of multiplexing 2B+D on the digital subscriber line into one set of signals. Allocation of DS0s is as follows.

| | |
|---|---|
| B1 channel | - - - DS0 |
| B2 channel | - - - DS0 |
| D channel | - - - DS0 |
| (own DSL: 2 bits such as bits 0 and 1) | |
| D channel | - - - same as above |
| (other DSL: 2 bits such as bits 2 and 3) | |
| D channel | - - - same as above |
| (other DSL: 2 bits such as bits 4 and 5) | |
| D channel | - - - same as above |
| (other DSL: 2 bits such as bits 6 and 7) | |
| M channel (eoc + I bit) | - - - EOC path |
| (eoc: embedded operation channel, I: indicator) | |

In the 4:1 time-division-multiplexing scheme, four D channels exclusively occupies the whole DS0. Because of this, it is necessary to attend to message conversion between EOC/eoc and EOC/Ibit on the ISDN-channel card with respect to M-channel information for maintenance purposes, so that the information is transmitted to the switch through an EOC path serving as a maintenance channel for the transmission device, i.e., through a control path between the switch and the subscriber-system transmission apparatus.

In the 3DS0 time-division-multiplexing scheme that is typically used in the analog-switch system or in the TR08-type digital-switch system, one DS0 is allocated to one D channel of the ISDN. For the purpose of efficient use of transmission lines, however, it has been required in an increasing number of cases to use the 4:1 time-division-multiplexing scheme in which one DS0 is allocated to four D channels. In the TR303-type digital switch system that has been recently chosen more often than not, the 4:1 time-division-multiplexing scheme is in prevalent use.

The 4:1 time-division-multiplexing scheme multiplexes four D channels, and transmits them as one DS0. While the conventional 3DS0 time-division-multiplexing scheme transmits the M channel as the D+ byte, the 4:1 time-division-multiplexing scheme cannot use the DS0 space for this purpose. As a result, it becomes necessary to convert the eoc bit and the I (indicator) bit of the M channel into EOC (i.e., the control path between the switch and the subscriber-system transmission apparatus) so as to attend to transmission between the switch and the subscriber-system transmission apparatus by using the EOC path that is separate from DS0.

If a new interface is newly designed for the EOC path, compatibility with conventional channel cards would be lost. A further problem is that there is a need to reconstruct the entire configuration of apparatus in response to the creation of new interface.

Switches that support the TR303-type digital switches are currently manufactured by various manufacturers. In order to connect with the TR303-type digital switches of various manufactures, alarm information on the ISDN subscriber lines needs to be transmitted by using a method of notification that complies to the different requirements of switches of different manufactures. Because of this, the subscriber-system transmission apparatus needs to manage and control alarm information on the subscriber line and to transmit the information through the control path (i.e., EOC) between the switch and the subscriber-system transmission apparatus.

The TR303-digital-switch system as described above employs the 4:1 time-division-multiplexing mode function for the purpose of connecting with IDTs (integrated digital terminals). In the 4:1 time-division-multiplexing mode, the EOC (embedded operation channel) is used to exchange control information between the TR303-type switch and the subscriber-system transmission apparatus 1 of the remote station. The standard TR-397 concerning the ISDN does not set forth details of the EOC (i.e., standards of alarm notification for the ISDN subscribers) in the 4:1 time-division-multiplexing mode. Manufactures that make switches supporting the TR303-type switches design and produce switches based on their own IDSN alarm-detection specifications. The subscriber-system transmission apparatuses also need to be changed in terms of their design specifications in compliance to the requirements of manufacturers. This gives rise to a problem of lack of universal applicability.

Accordingly, there is a need for a subscriber-system transmission apparatus which is adaptable to either type of ISDN switches that is based on the 3DS0 time-division-multiplexing scheme or the 4:1 time-division-multiplexing scheme while keeping compatibility with the prior-art multiplexing/demultiplexing interface.

SUMMARY OF THE INVENTION

It is a general object of the present invention to provide an apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an apparatus for transmission between subscriber terminals and digital switches that employ a 4:1 time-division-multiplexing scheme, the apparatus including a main path for carrying signals between the subscriber terminals and digital switches, a control path which is separate from said main path and carries control information for maintenance purpose, and an interface-&-control unit which converts the control information so as to conform to specifications of the said digital switches wherein the conversion of the control information is based on switch settings made to said interface-&-control unit.

In the above apparatus, the switch settings are selected in accordance with the types of the digital switches, and are used to conform to the specifications of the digital switches. This ensures that the apparatus can cope with various types of digital switches, providing universal applicability in terms of connections with digital switches.

Further, according to another aspect of the present invention, an apparatus for transmission between subscriber terminals and digital switches that employ a 4:1 time-division-multiplexing scheme includes a main path for carrying signals between the subscriber terminals and digital switches, a control path which is separate from said main path and carries control information for maintenance purpose, and a subscriber-side interface unit which transmits an alarm notification to the digital switches via said control path wherein the alarm notification conforms to specifications of said digital switches based on switch settings made to said subscriber-side interface unit.

In the apparatus as described above, the switch settings are selected in accordance with the types of the digital switches used in the network to which subscriber terminals belong, and are used to conform to the specifications of the digital switches. This ensures that the apparatus can cope with the various types of digital switches used in the network regardless of the network to which the subscribers belong. In other words, any user using any network can be covered by the apparatus of the present invention.

BRIEF DESCRIPTION OF THE DRAWINGS

FIG. 5 is a table showing ISDN-alarm-notification commands and values thereof that are transmitted in response to the switch option settings corresponding to each switch vendor;

FIG. 6 is a table showing ISDN-alarm-notification commands and values thereof that are transmitted in response to the switch option settings corresponding to each switch vendor;

FIG. 7 is a table showing ISDN-alarm-notification commands and values thereof that are transmitted in response to the switch option settings corresponding to each switch vendor;

FIG. 8 is a table showing ISDN alarm notification commands and values thereof transmitted in response to switch settings of an EOC-control unit of an EOC control card;

FIG. 9 is a table showing ISDN alarm notification commands and values thereof transmitted in response to switch settings of the EOC-control unit of the EOC control card;

FIG. 10 is a table showing ISDN alarm notification commands and values thereof transmitted in response to switch settings of the EOC-control unit of the EOC control card;

FIG. 11 is a table showing ISDN alarm notification commands and values thereof transmitted in response to switch settings of the EOC-control unit of the EOC control card;

FIG. 12 is a table showing standards of ISDN alarm messages that are transmitted in response to switch settings of the SW-interface unit of the SW-interface unit;

FIG. 13 is a table showing standards of ISDN alarm messages that are transmitted in response to switch settings of the SW-interface unit of the SW-interface unit;

FIG. 14 is a table showing standards of ISDN alarm messages that are transmitted in response to switch settings of the SW-interface unit of the SW-interface unit;

DESCRIPTION OF THE PREFERRED EMBODIMENTS

In the following, embodiments of the present invention will be described with reference to the accompanying drawings.

Figure 1:
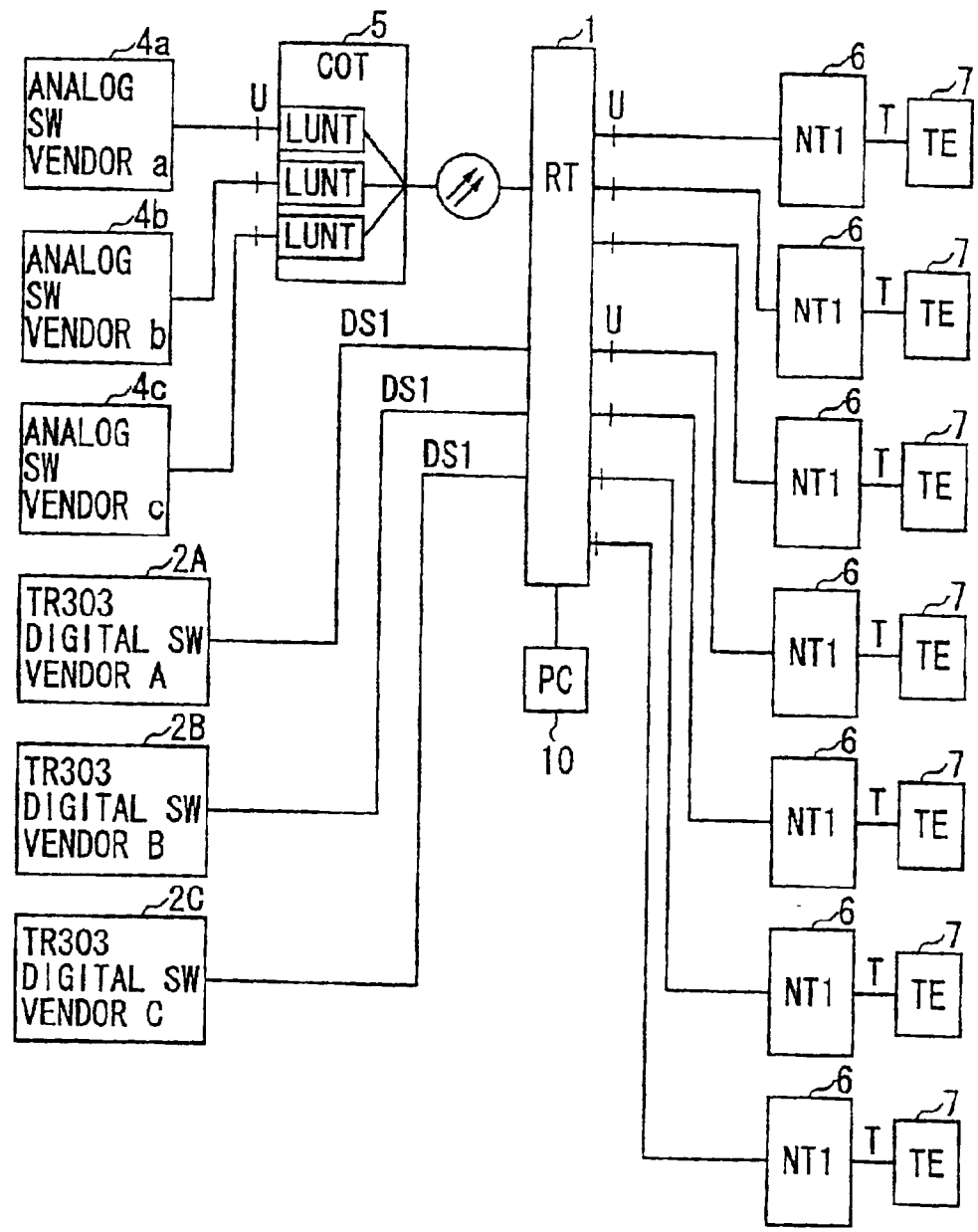
FIG. 1 is a block diagram of an IDLC system including a subscriber-system transmission apparatus according to an embodiment of the present invention.

FIG. 1 is a block diagram of an IDLC system including a subscriber-system transmission apparatus according to an embodiment of the present invention.

In FIG. 1, the subscriber-system transmission apparatus 1 is connected to TR303-type digital switches 2A, 2B, and 2C corresponding to respective vendors A, B, and C. This connection is established via optical-fiber transmission lines based on DS1 interface. Further, the subscriber-system transmission apparatus 1 is connected to analog switches 4a, 4b, and 4c corresponding to respective vendors a, b, and c via optical-fiber transmission lines and a center-station-system transmission apparatus 5.

The subscriber-system transmission apparatus 1 covers a plurality of ISDN subscriber terminals 7 via NT1 (network-terminal-apparatus-1) apparatuses 6. Each user of the subscriber terminals 7 belongs to his/her choice of a service-provider network where service-provider networks adopt switches manufactured by vendors of their own choice. When a user attempts to transmit or receive a call, he/she establishes connection with the service-provider network to which he/she belongs.

A control console 10 connected to the subscriber-system transmission apparatus 1 is comprised of a personal computer or the like, which is used for making various settings to the subscriber-system transmission apparatus 1 in terms of switch options and the like.

In this manner, the subscriber-system transmission apparatus 1 is provided with the DS1 interface for the IDTs (integrated digital terminals), and includes an EOC interface unit and a cross-connect unit therein for switching between the 3DS0 time-division-multiplexing scheme and the 4:1 time-division-multiplexing scheme. This makes it possible to assume an IDLC configuration based on the 4:1 time-division-multiplexing scheme. Further, this system can be regarded as the 3DS0-scheme system having an additional configuration based on the 4:1 time-division-multiplexing scheme. A mode-switch unit is provided to operate under control of the operation system to switch between the 3DS0 time-division-multiplexing scheme and the 4:1 time-division-multiplexing scheme. Because of such a configuration, this system can be connected to both the switches of 3DS0 time-division-multiplexing scheme and the switches of the 4:1 time-division-multiplexing scheme.

Figure 2:
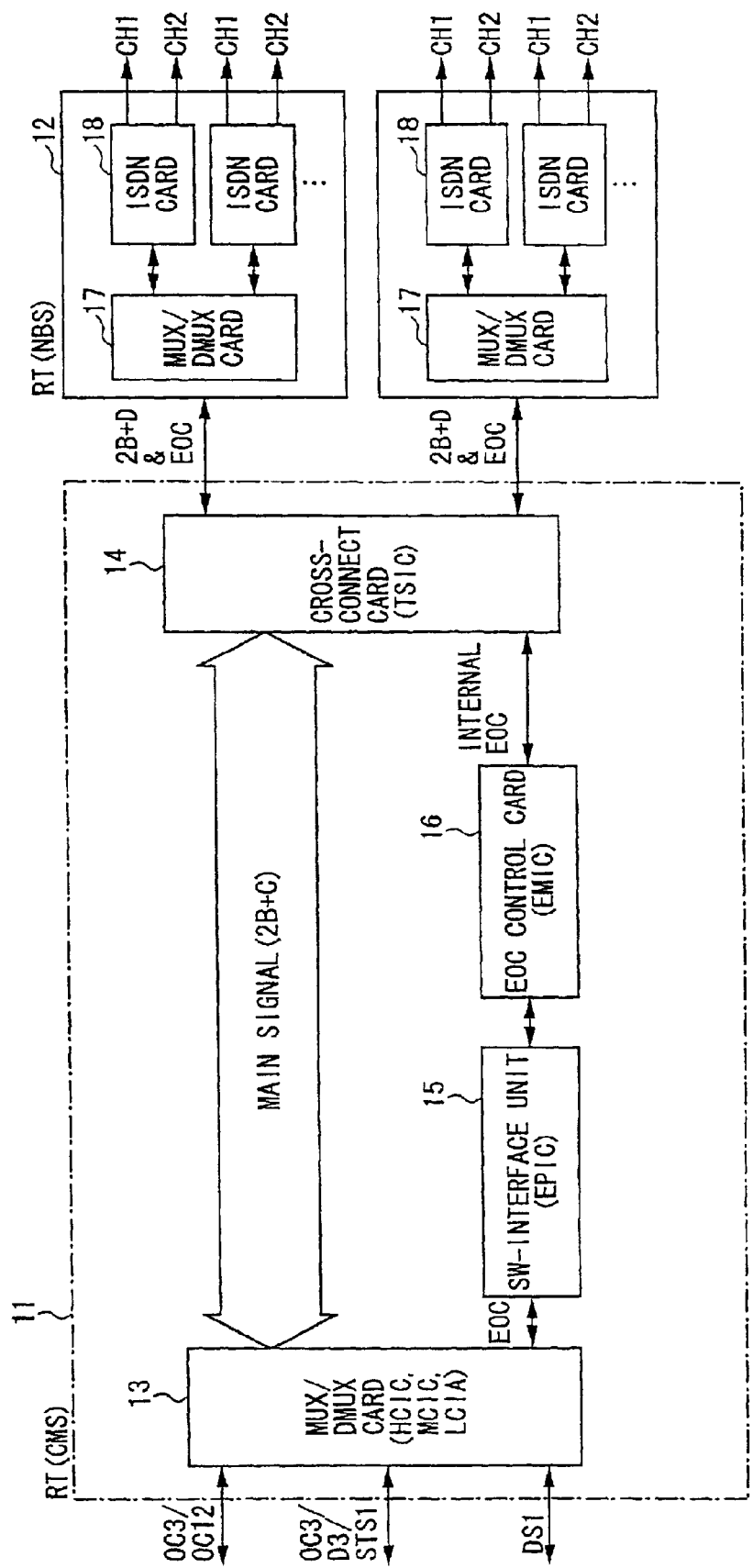
FIG. 2 is a block diagram of a relevant portion of the subscriber-system transmission apparatus for the purpose of explaining an EOC path during a 4:1 time-division-multiplexing mode.

FIG. 2 is a block diagram of a relevant portion of the subscriber-system transmission apparatus 1 according to this embodiment for the purpose of explaining an EOC path during the 4:1 time-division-multiplexing mode.

As show in FIG. 2, the subscriber-system transmission apparatus 1 includes a common shell 11 and narrow band shells 12. The common shell 11 includes a multiplexing/demultiplexing card 13, a cross-connect card 14, a SW-interface unit 15, and an EOC control card 16. The multiplexing/demultiplexing card 13 is comprised of a HC1A/HO10 unit, a TS1A unit, MC1O unit, etc. The cross-connect card 14 is comprised of a TS1C unit or the like, and the SW-interface unit 15 includes an EP1C unit or the like. The EOC control card 16 includes an EM1C unit or the like.

The narrow band shells 12 are provided as many as 10 units in parallel, and are connected to the cross-connect card 14 of the common shell 11. Each narrow band shell 12 includes a multiplexing/demultiplexing card 17 and 48 ISDN channel cards 18.

The multiplexing/demultiplexing card 13 of the common shell 11 is connected to the optical-fiber transmission lines via various interfaces such as OC3/OC12, OC3/D3/STS1, or DS1. Main signals 2B+D demultiplexed by the multiplexing/demultiplexing card 13 are supplied to the cross-connect card 14 during a period when the 4:1 time-division-multiplexing scheme is selected. In an opposite direction, the main signal 2B+D multiplexed by the cross-connect card 14 are supplied to the multiplexing/demultiplexing card 13.

An EOC signal demultiplexed by the multiplexing/demultiplexing card 13 is supplied to the cross-connect card 14 as an internal EOC after passing through the SW-interface unit 15 and the EOC control card 16. In the opposite direction, the internal EOC multiplexed by the cross-connect card 14 is supplied to the multiplexing/demultiplexing card 13 via the EOC control card 16 and the SW-interface unit 15.

The narrow band shells 12 attend to EOC/eoc conversion processing and EOC/I-bit conversion processing, and supply or receive the 2B+D and M channels at the U-point interface.

In FIG. 2 showing the EOC path during the 4:1 time-division-multiplexing mode, signals transmitted to or received from OC3/OC12 are exchanged with the cross-connect card 14 via the multiplexing/demultiplexing card 13. On the other hand, the EOC (e.g., eoc bit+I bit) during the 4:1 time-division-multiplexing mode is exchanged between the multiplexing/demultiplexing card 13 and the narrow band shells 12 via the SW-interface unit 15 and the EOC control card 16 where SW-interface unit 15 provides necessary interface, and the EOC control card 16 attends to EOC control.

As shown in FIG. 1, the switch system employing the subscriber-system transmission apparatus 1 does not require the related-art center-station (COT) transmission device 5 when it is connected to the TR303-type digital switches 2A through 2C. That is, the subscriber-system transmission apparatus 1 is connected to the TR303-type digital switches 2A through 2C via interface such as DS1. Since interface specifications (e.g., ISDN alarm detection) differ from vendor to vendor who manufacture the TR303-type digital switches 2A through 2C, a method of notifying an ISDN alarm is changed depending on the types of the TR303-type digital switches 2A through 2C.

To this end, the control console 10 connected to the subscriber-system transmission apparatus 1 is used for making settings to switch options SWOPT. These settings make it possible to perform ISDN-alarm notification that complies to each of the switches. In the subscriber-system transmission apparatus 1, the switch options SWOPT may define that the companies A and C correspond to SWOPT1 and that the company B correspond to SWOPT2. The control console 10 serving as a switch-option setting unit is used for setting appropriate data to the SW-interface unit 15, the EOC control card 16, and the ISDN channel cards 18, thereby complying to the requirements of the switch to be connected. Switch option SWOPT3 is not in use because there is no vendor corresponding to this option. However, operation is guaranteed based on software specifications prior to correction of problems, so that backward compatibility is secured so as not to cause malfunction in apparatuses having only the EM1C unit thereof updated.

Figure 3:
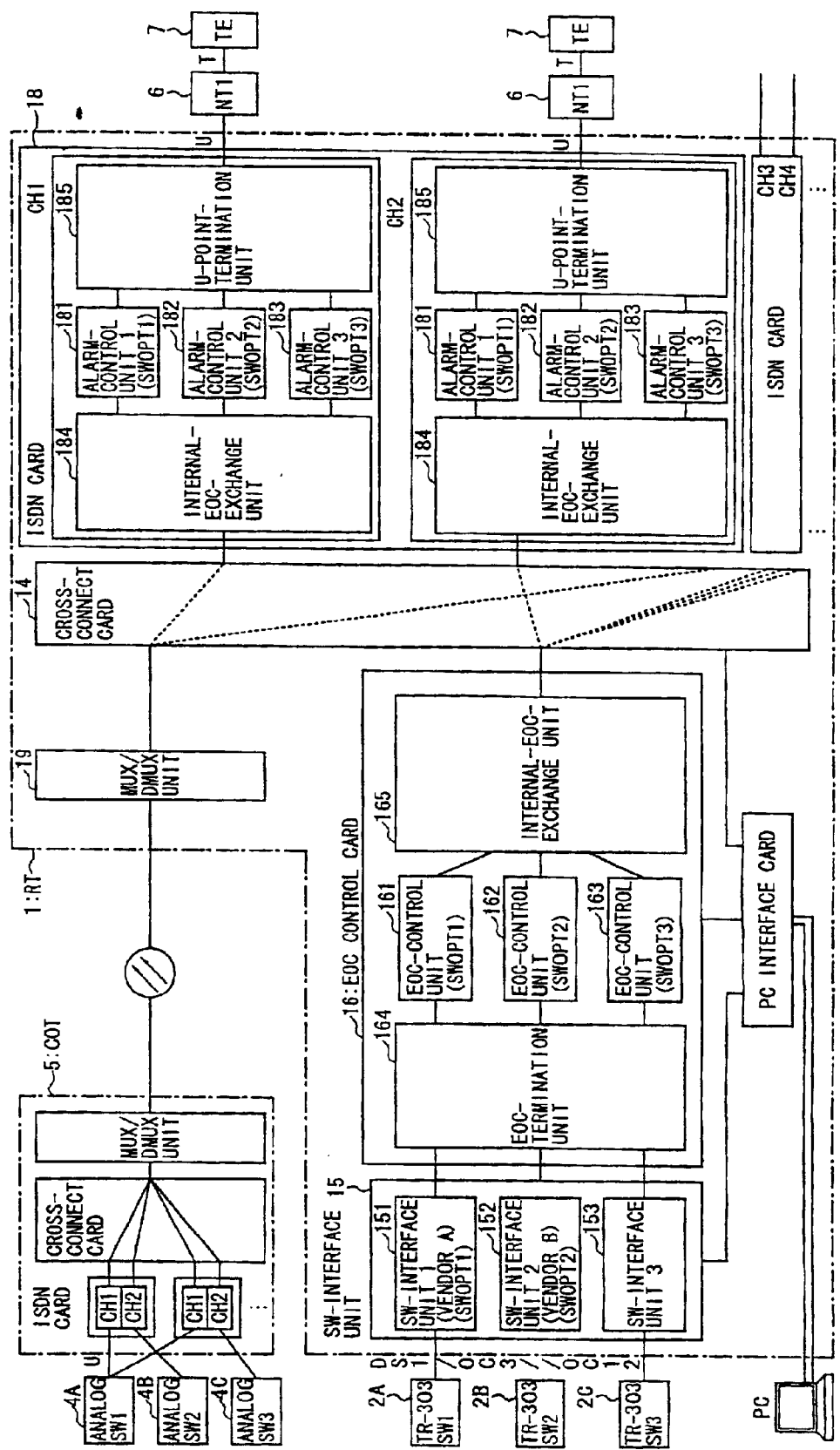
FIG. 3 is a block diagram showing details of a portion relevant to settings of switch options in the subscriber-system transmission apparatus.

FIG. 3 is a block diagram showing details of a portion relevant to settings of switch options in the subscriber-system transmission apparatus 1. FIG. 3 is used for explaining a method of controlling alarm when the subscriber-system transmission apparatus 1 is connected to all the switches.

In FIG. 3, the TR303-type digital switch 2A is made by the manufacturer A, and is connected to the subscriber-system transmission apparatus 1 via DS1. The switch setting is SWOPT1. The TR303-type digital switch 2B is made by the manufacturer B, and is connected to the subscriber-system transmission apparatus 1 via OC3. The switch setting is SWOPT2. The TR303-type digital switch 2C is a product of the manufacturer C, and is connected to the subscriber-system transmission apparatus 1 via OC12. The switch setting is SWOPT1.

The SW-interface unit 15 of the subscriber-system transmission apparatus 1 includes three SW-interface units 151 through 153 corresponding to the respective TR303-type digital switches. The SW-interface units 151 through 153 can be set to the switch option SWOPT1, SWOPT2, or SWOPT3 by using the control console (SWOPT setting unit) 10. In this example, the SW-interface units 151 and 153 respectively connected to the TR303-type digital switches 2A and 2C are set to the switch setting (switch option) SWOPT1, and the SW-interface unit 152 connected to the TR303-type digital switch 2B is set to the switch option SWOPT2.

The SW-interface units 151 through 153 attend to conversion resembling language conversion, as will be described later, which corresponds to specifications of each of the TR303-type digital switches 2A through 2C.

The EOC control card 16 includes three EOC-control units 161 through 163, which correspond to the SW-interface units 151 through 153 of the SW-interface unit 15, respectively. The EOC-control units 161 through 163 are set to the switch option SWOPT1, SWOPT2, or SWOPT3 to conform to the switch-option settings of the SW-interface units 151 through 153 set by the control console 10. In the example shown in FIG. 3, the EOC-control unit 161 has the switch option thereof set to SWOPT1 in conformity with the switch option setting of the SW-interface unit 151, and controls the EOC supplied from the SW-interface unit 151 via an EOC-termination unit 164. Further, the EOC-control unit 161 exchanges the internal EOC with the ISDN channel cards 18 via an internal-EOC-exchange unit 165.

The EOC-control units 161 through 163 convert alarm formats to conform to the specifications of the TR303-type digital switches 2A through 2C, which will be described later.

The cross-connect card 14 is provided between the EOC control card 16 and the ISDN channel cards 18, and attends to cross-connect processing. Under the remote control of the control console 10, the cross-connect card 14 can switch between the 4:1 time-division-multiplexing scheme and the 3DS0 time-division-multiplexing scheme with respect to each subscriber, and can establish a cross-connect between a given subscriber and any given subscriber number of any given switch. Further, the cross-connect card 14 has service statuses (e.g., used/unused statuses of the B1 and B2 channels) and provisioning (e.g., settings of 4:1 TDM and 3DS0 TDM) thereof set through remote controlling.

Each of the ISDN channel cards 18 has 2 channels, each of which is connected to a corresponding one of the subscriber terminals (TE) 7 via the NT1 apparatus 6. Each channel of each ISDN channel card 18 includes three alarm-control units 181 through 183, an internal-EOC-exchange unit 184, and a U-point-termination unit 185. The alarm-control units 181 through 183 are set to the switch option SWOPT1, SWOPT2, or SWOPT3. The internal-EOC-exchange unit 184 is equipped with the function of EOC/eoc conversion and the function of EOC/I-bit conversion.

Figure 4:
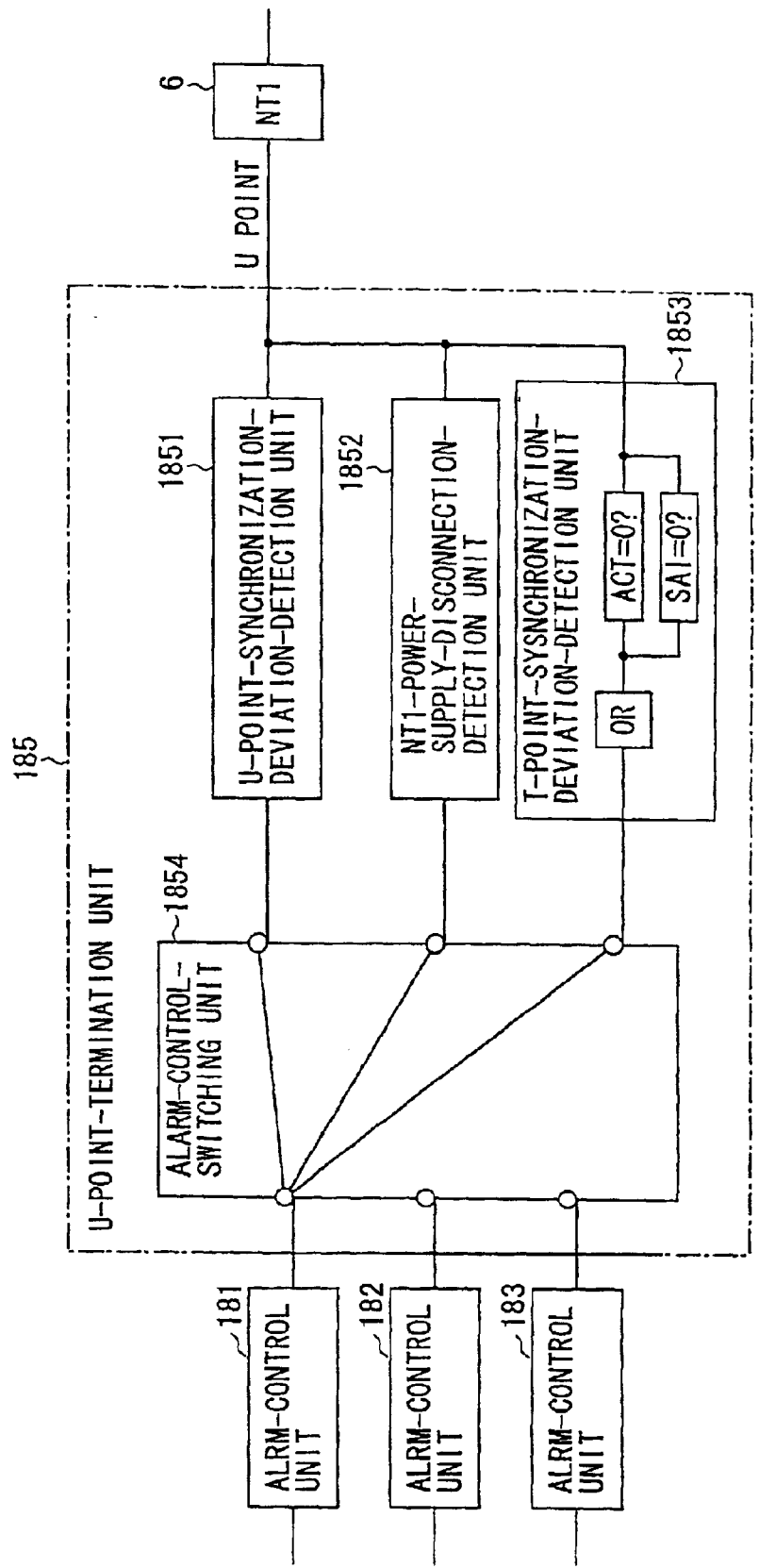
FIG. 4 is a block diagram showing a configuration of a U-point-termination unit.
Figure 15:
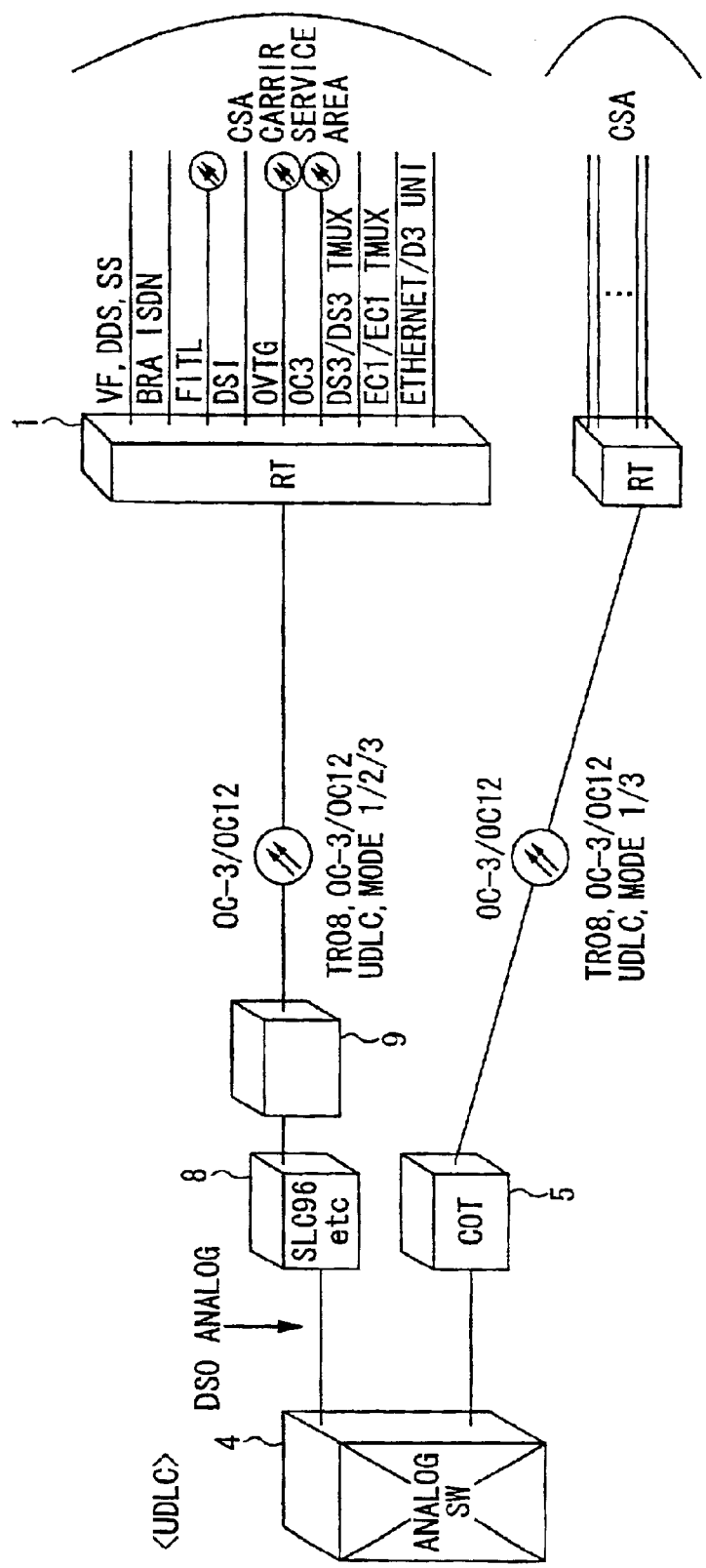
FIG. 15 is an illustrative drawing showing a remote-station switch system having a UDLC network configuration.
Figure 16:
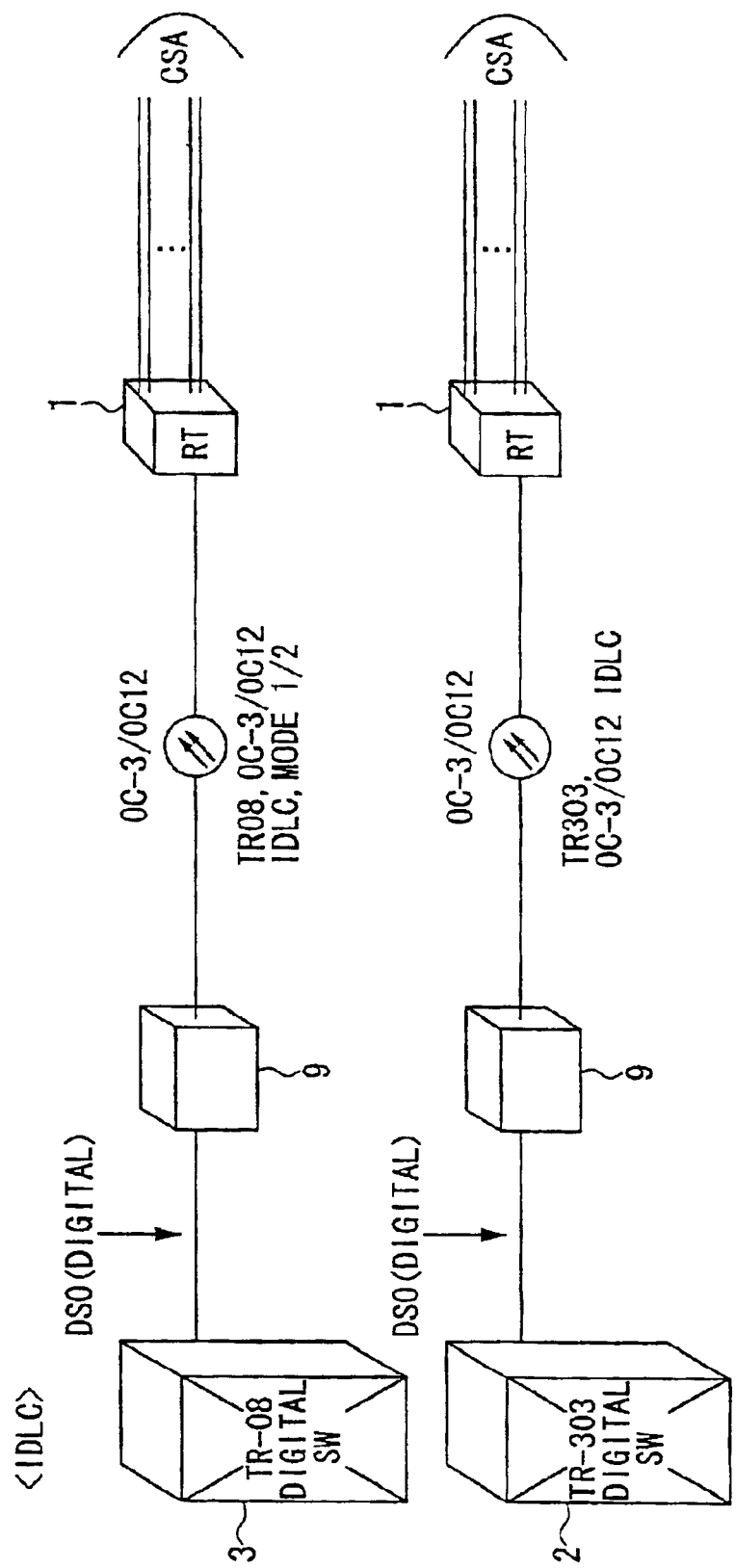
FIG. 16 is an illustrative drawing showing a remote-station switch system having an IDLC network configuration.
Figure 17:
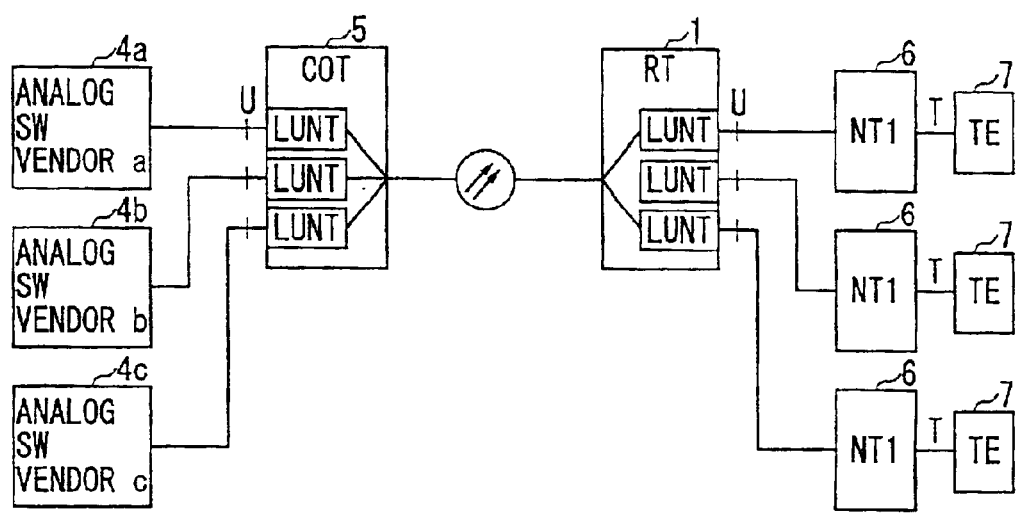
FIG. 17 shows a related-art UDLC system.

FIG. 4 is a block diagram showing a configuration of the U-point-termination unit 185.

The U-point-termination unit 185 includes a U-point-synchronization-deviation-detection unit 1851, a NT1-power-supply-disconnection-detection unit 1852, a T-point-synchronization-deviation-detection unit 1853, alarm-control-switching unit 1854. The U-point-synchronization-deviation-detection unit 1851 detects loss of synchronization when synchronization is lost at the U point serving as connection interface with the NT1 apparatus 6. The NT1-power-supply-disconnection-detection unit 1852 detects disconnection of power supply to the NT1 apparatus 6. The T-point-synchronization-deviation-detection unit 1853 detects loss of synchronization when synchronization is lost at the T point. The alarm-control-switching unit 1854 selectively connects to one of the alarm-control units 181 through 183.

The alarm-control-switching unit 1854 is almost permanently connected to one of the alarm-control units 181 through 183. This connected one of the alarm-control units 181 through 183 has the switch option SWOPT thereof set to conform to a TR303-type digital switch that is employed by the network to which the user of the channel belongs.

In the example of FIG. 3, the channel CH1 of the ISDN channel card 18 is used by a user who belongs to a service-provider network that employs the TR303-type digital switch 2A manufactured by the manufacturer A. In order to connect the channel CH1 to the TR303-type digital switch 2A, the control console 10 is used to make connection settings to the cross-connect card 14. After this connection is established, the channel CH1 is set by the EOC control card 16 such as to carry out alarm control of the switch option SWOPT1.

FIG. 5 through FIG. 7 are tables showing ISDN-alarm-notification commands and values thereof that are transmitted in response to the switch option settings corresponding to each switch vendor. FIG. 5 shows a case in which the alarm condition indicates loss of synchronization at the U point. FIG. 6 shows a case where the power supply to the NT1 is disconnected. FIG. 7 shows a case in which synchronization is lost at the T point.

With respect to the switch venders A and C, a notification command that corresponds to the switch option SWOPT of 1 is used. With respect to the switch vendor B, a notification command that corresponds to the switch option SWOPT of 2 is used. Since the switch option SWOPT of 3 does not correspond to any vendor, it is not currently used. However, operation is guaranteed based on software specifications prior to correction of problems, so that backward compatibility is secured so as not to cause malfunction in apparatuses having only the EM1C unit thereof updated. What is shown in the figure is an EOP report that the subscriber-system transmission apparatus 1 transmits to the switch 2. LTOH represents m bits directed downstream at the U point, and NTOH represents m bits directed upstream at the U point.

In the case of loss of synchronization at the point U as shown in FIG. 5, the Alarm Status Change Report is transmitted if the switch setting is SWOPT1 corresponding to the vendor A. In this case, LTOH='0111 1111 111' b, and NTOH='0000 0000 000' b.

If the switch setting is SWOPT2 corresponding to the vendor B, the Alarm Status Change Report and the NT1 Overhead Change Report are transmitted. In this case, LTOH='0111 1111 111' b, and NTOH='000x x101 111' b, where "x" is the same value as one observed before loss of synchronization at the U point. If the switch setting is a default setting SWOPT3 corresponding to no vendor, the Alarm Status Change Report is transmitted. In this case, LTOH='1111 1111 111' b, and NTOH=value received from the NT1 apparatus.

In this manner, the U-point-synchronization-deviation-detection unit detects loss of synchronization at the U point, and notifies the switch of the alarm status. In so doing, only the Alarm Status Change Report should be sent to the switch if the switch is a product of the vendor A or C corresponding to the switch option SWOPT1. Further, the act bit of LTOH should be set to 0, and all bits of NTOH should be set to 0. If the switch is a product of the vendor C corresponding to the switch option SWOPT2, both the Alarm Status Change Report and the NT1 Overhead Change Report should be sent. In this case, the act bit of LTOH should be set to 0. Further, the act bit, the ps1 bit, the ps2 bit, and the sai bit of NTOH should be set to 0.

In the case of disconnection of power supply to the NT 1 as shown in FIG. 6, the Alarm Status Change Report is transmitted if the switch setting is SWOPT1 corresponding to the vendor A. In this case, LTOH='0111 1111 111' b, and NTOH='0000 0000 000' b.

If the switch setting is SWOPT2 corresponding to the vendor B, the Alarm Status Change Report and the NT1 Overhead Change Report are transmitted. In this case, LTOH='0111 1111 111' b, and NTOH='000x x101 111' b, where "x" is the same value as one observed before disconnection of power supply to the NT1. If the switch setting is a default setting SWOPT3 corresponding to no vendor, the Alarm Status Change Report is transmitted. In this case, LTOH='1111 1111 111' b, and NTOH=value received from the NT1 apparatus.

In this manner, the status of disconnection of power supply to the NT1 is the same as the status of loss of synchronization at the U point, resulting in transmission of the same messages.

In the case of loss of synchronization at the T point as shown in FIG. 7, the NT1 Overhead Change Report is transmitted if the switch setting is SWOPT1 corresponding to the vendor A. In this case, LTOH='1111 1111 111' b, and NTOH='0xxx xxxx xxx' b, where "x" is the same value as one observed before loss of synchronization at the T point. If the switch setting is SWOPT2 corresponding to the vendor B, the NT1 Overhead Change Report are transmitted. In this case, LTOH='1111 1111 111' b, and NTOH='0xxx xx0x xxx' b, where "x" is the same value as one observed before loss of synchronization at the T point. If the switch setting is a default setting SWOPT3 corresponding to no vendor, the NT1 Overhead Change Report is transmitted. In this case, LTOH='1111 1111 111' b, and NTOH=value received from the NT1 apparatus.

In this manner, the T-point-synchronization-deviation-detection unit detects loss of synchronization at the T point, and notifies the switch of the alarm status. The switch corresponding to the switch setting SWOPT1 detects loss of synchronization at the T point if the act bit of LTIH is 1 and the act bit of NTOH is 0. On the other hand, the switch corresponding to the switch setting SWOPT2 detects loss of synchronization at the T point if the act bit of LTOH, the act bit of NTOH, and the sai bit are 1, 0, 0, respectively. Because of this, values as shown in FIG. 7 are transmitted to let the switches properly detect loss of synchronization at the T point.

FIG. 8 through FIG. 11 are tables showing ISDN alarm notification commands and values thereof transmitted in response to switch settings of the EOC-control unit of the EOC control card 16. FIG. 8 shows a case in which no ISDN channel card is in a card slot. FIG. 9 shows a case in which synchronization is lost at the U point. FIG. 10 demonstrates a case where the power supply to the NT1 is disconnected. FIG. 11 exhibits a case in which synchronization is lost at the T point.

When no ISDN channel card is in a card slot as shown in FIG. 8, for example, only the M Event Report for ISDN-line-termination purposes should be transmitted if the switch setting is SWOPT1. If the switch setting is SWOPT2, however, the M Event Report for ISDN-framing-path-termination-change purposes in the Overhead Bit Report should be transmitted in addition to the M Event Report for ISDN-line-termination purposes. The M Event Report for ISDN-framing-path-termination-change purposes in the Overhead Bit Report should include data of LTOH ad NTOH as shown in FIG. 8.

FIG. 12 through FIG. 14 are tables showing standards of ISDN alarm messages that are transmitted in response to switch settings of the SW-interface unit of the SW-interface unit 15. FIG. 12 shows ISDN alarm messages where the switch option is SWOPT1 corresponding to the vendor A. FIG. 13 illustrates ISDN alarm messages where the switch option is SWOPT2 corresponding to the vendor B. FIG. 14 exhibits ISDN alarm messages where the switch option is set to a default value SWOPT3 corresponding to no existing vendor.

The subscriber-system transmission apparatus 1 operates as follows based on the mechanism as described above. In the following, it is assumed that the subscriber terminal 7 covered by the channel CH1 of the ISDN channel cards 18 belongs to the service-provider network employing the TR303-type digital switch 2A of the vendor A, and that the subscriber terminal 7 covered by the channel CH2 belongs to the service-provider network employing the TR303-type digital switch 2B of the vendor B. As a consequence, the alarm-control-switching unit 1854 of the U-point-termination unit 185 for the channel CH1 is controlled so as to select the alarm-control unit 181 that corresponds to the switch setting SWOPT1 of the vendor-A switch. Further, the alarm-control-switching unit 1854 of the U-point-termination unit 185 for the channel CH2 is controlled so as to select the alarm-control unit 182 that corresponds to the switch setting SWOPT2 of the vendor-B switch.

When the ISDN channel card 18 is taken out of the slot, for example, the EOC-control units 161 and 162 of the EOC control card 16 transmits alarm messages to the TR303-type digital switches 2A and 2B, respectively, thereby notifying the inoperative statuses of the channels CH1 and CH2.

When synchronization is lost at the U point of the channel CH1 in the ISDN channel card 18, for example, the U-point-termination unit 185 of the channel CH1 detects loss of synchronization at the U point. In response, the alarm-control unit 181 transmits an alarm-notification command that conforms to the switch option SWOPT1, and this command is supplied to the TR303-type digital switch 2A from the internal-EOC-exchange unit 184 via the cross-connect card 14, the EOC control card 16, and the SW-interface unit 15. This TR303-type digital switch 2A corresponds to the switch option SWOPT1. When synchronization is lost at the U point of the channel CH2, for example, the U-point-termination unit 185 of the channel CH2 detects loss of synchronization at the U point. In response, the alarm-control unit 182 transmits an alarm-notification command that conforms to the switch option SWOPT2, and this command is supplied to the TR303-type digital switch 2B from the internal-EOC-exchange unit 184 via the cross-connect card 14, the EOC control card 16, and the SW-interface unit 15. This TR303-type digital switch 2B corresponds to the switch option SWOPT2.

When synchronization is lost at the T point of the channel CH1 in the ISDN channel cards 18, the NT1 apparatus 6 connected to the channel CH1 sends a m-bit message indicative of loss of T-point synchronization to the channel CH1 of the ISDN channel cards 18 by passing the message through the U point. The alarm-control unit 181 then uses an alarm-notification command to transmit the EOC where the alarm-notification command conforms to the requirements of the vendor A.

In the following, operation of the U-point-termination unit 185 will be described in detail with reference to FIG. 4. As was previously described, the U-point-termination unit 185 includes the U-point-synchronization-deviation-detection unit 1851, the NT1-power-supply-disconnection-detection unit 1852, and the T-point-synchronization-deviation-detection unit 1853. It should be noted here that the number of m bits used for reporting loss of synchronization at the T point varies depending on the types of NT1 apparatuses.

Some notify by use of the act bit that is 0, and others notify by use of the sai bit that is 0. There are still some others that notify by use of the act bit and sai bit that are both zero. In order to detect loss of T-point synchronization with respect to any variation of these, the T-point-synchronization-deviation-detection unit 1853 of the U-point-termination unit 185 detects loss of T-point synchronization by checking if either one of the act bit and the sai bit is 0. When the m-bit message is supplied to the switch without any processing thereof, the switch cannot properly detect the loss of T-point synchronization. Because of this reason, the alarm-control unit 181 attends to conversion into LTOH and NTOH values that conform to the requirements of the vendor-A switch. This ensures that any type of a switch can be properly notified of loss of T-point synchronization regardless of the type of the NT1 that is connected to the ISDN channel card.

In the description provided above, the switches connected to the subscriber-system transmission apparatus 1 have been referred to as the TR303-type digital switches. If the switches of a network-service provider to which subscriber terminals belong are TR08-type digital switches, then, connection is established by using the TR08-type-switch mode. By the same token, if analog switches are used, connection is established by using the analog-switch mode.

For connection during the TR08-type-switch mode, none of the SW-interface unit 15 and the EOC control card 16 of the subscriber-system transmission apparatus 1 are used. Signals from the TR08-type digital switch are provided from the multiplexing/demultiplexing card 13 to the cross-connect card 14, which has switched to the 3DS0 time-division-multiplexing scheme. The alarm-control unit of the ISDN channel card 18 in this case is comprised of only one type of alarm-control unit that conforms to the specifications of the TR08-type digital switch.

For connection during the analog-switch mode, the NT1 apparatus 6 of the subscriber terminal 7 is connected via the U-point-termination unit 185 of the ISDN channel card 18 directly to the cross-connect card 14, which has switched to the 3DS0 time-division-multiplexing scheme. This connection is established without having the alarm-control units 181 through 183 or the internal-EOC-exchange unit 184 as intervening units. Further, the connection is extended from the cross-connect card 14 to the center-station-system transmission apparatus 5 via an analog-switch multiplexing/demultiplexing unit 19 and the optical-fiber transmission line.

As described above, according to the present invention, no special work such as exchange of modules is necessary when there is a need to connect with switches operating based on the 4:1 time-division-multiplexing scheme. A relatively simple configuration includes the EOC-interface unit, the 4:1 TDM-cross-connect unit, the EOC/eoc-&-EOC/I-bit-conversion unit, etc., which is all that is necessary to implement the ISDN service providing connections with digital switches based on 4:1 time-division-multiplexing scheme in addition to rendering of the 3DS0 time-division-multiplexing service.

Further, the same configuration as in the conventional art is used with regard to MUX/DMUX interface, U-point interface, line structures, etc., thereby making it possible to cope with switches of the 4:1 time-division-multiplexing scheme without requiring major changes that may affect existing services.

Further, the present invention is not limited to these embodiments, but various variations and modifications may be made without departing from the scope of the present invention.

The present application is based on Japanese priority application No. 2000-076034 filed on Mar. 17, 2000, with the Japanese Patent Office, the entire contents of which are hereby incorporated by reference.

What is claimed is:

1. An apparatus for transmission between subscriber terminals and digital switches that employ a 4:1 time-division-multiplexing scheme, comprising:
   a main path for carrying signals between the subscriber terminals and digital switches;
   a control path which is separate from said main path and carries control information for maintenance purpose; and
   an interface-&-control unit which is provided on said control path, and which converts the control information on said control path so as to make the control information conform to specifications of the said digital switches wherein the conversion of the control information is based on switch settings made to said interface-&-control unit.

2. The apparatus as claimed in claim 1, further comprising a cross-connect unit which provides cross connections, and switches between the 4:1 time-division-multiplexing scheme and a 3DS0 time-division-multiplexing scheme with respect to each subscriber.

3. The apparatus as claimed in claim 1, further comprising:
   a multiplexing/demultiplexing unit serving as interface for analog switches; and
   a cross-connect unit which selects said multiplexing/demultiplexing unit as interface to establish connection between the subscriber terminals and the analog switches.

4. An apparatus for transmission between subscriber terminals and digital switches that employ a 4:1 time-division-multiplexing scheme, comprising:
   a main path for carrying signals between the subscriber terminals and digital switches;
   a control path which is separate from said main path and carries control information for maintenance purpose; and
   a subscriber-side interface unit which transmits an alarm notification to the digital switches via said control path wherein the alarm notification is configured in response to switch settings made to said subscriber-side interface unit so as to conform to specifications of said digital switches.

5. The apparatus as claimed in claim 4, wherein said subscriber-side interface unit is provided with a function of EOC/eoc conversion.

6. The apparatus as claimed in claim 4, wherein said subscriber-side interface unit is provided with a function of EOC/I-bit conversion.

7. The apparatus as claimed in claim 4, further comprising a cross-connect unit which provides cross connections, and switches between the 4:1 time-division-multiplexing scheme and a 3DS0 time-division-multiplexing scheme with respect to each subscriber.

8. The apparatus as claimed in claim 7, wherein said cross-connect unit has service statuses and provisioning thereof set through remote controlling.

9. The apparatus as claimed in claim 7, wherein said cross-connect unit is provided with a function of establishing cross connection between a given user and any given subscriber number of any given switch.

10. The apparatus as claimed in claim 4, further comprising:
    a multiplexing/demultiplexing unit serving as interface for analog switches; and
    a cross-connect unit which selects said multiplexing/demultiplexing unit as interface to establish connection between the subscriber terminals and the analog switches.

* * * * *